(12) United States Patent
Nolan

(10) Patent No.: US 10,660,311 B2
(45) Date of Patent: May 26, 2020

(54) SCENT TRAINING WHEEL

(71) Applicant: Patrick L. Nolan, Smithsburg, MD (US)

(72) Inventor: Patrick L. Nolan, Smithsburg, MD (US)

(*) Notice: Subject to any disclaimer, the term of this patent is extended or adjusted under 35 U.S.C. 154(b) by 322 days.

(21) Appl. No.: 15/582,921

(22) Filed: May 1, 2017

(65) Prior Publication Data
US 2018/0310524 A1 Nov. 1, 2018

(51) Int. Cl.
*A01K 15/02* (2006.01)
*F16M 11/08* (2006.01)

(52) U.S. Cl.
CPC .............. *A01K 15/02* (2013.01); *F16M 11/08* (2013.01); *F16M 2200/024* (2013.01)

(58) Field of Classification Search
CPC ........ A01K 15/02; A01K 5/0114; A01K 5/02; A01K 15/027; F16M 11/08; F16M 11/18; Y10S 119/905
See application file for complete search history.

(56) References Cited

U.S. PATENT DOCUMENTS

| | | | |
|---|---|---|---|
| 3,424,132 A | 1/1969 | Fischer et al. | |
| 3,773,018 A | 11/1973 | Profughi | |
| 3,981,274 A | 9/1976 | Curtis | |
| 4,766,848 A * | 8/1988 | Rocco | A01K 1/04 119/701 |
| 6,213,056 B1 | 4/2001 | Bergmann et al. | |
| 6,837,178 B1 * | 1/2005 | Nall | A01K 39/014 119/57.8 |
| 7,028,636 B2 * | 4/2006 | Weiser | A01K 39/014 119/57.8 |
| 7,162,974 B2 * | 1/2007 | Tippetts | A01K 5/0114 119/57.8 |
| 7,198,008 B2 | 4/2007 | Poyner | |
| 9,545,081 B2 | 1/2017 | Nolan | |
| 2006/0174843 A1 | 8/2006 | Poyner | |
| 2006/0283394 A1 * | 12/2006 | McLaughlin | A01K 5/0114 119/51.03 |
| 2015/0264892 A1 | 9/2015 | Nir et al. | |
| 2016/0081302 A1 | 3/2016 | Hare et al. | |

* cited by examiner

*Primary Examiner* — Trinh T Nguyen

(74) *Attorney, Agent, or Firm* — Edell, Shapiro & Finnan, LLC

(57) ABSTRACT

A scent training wheel for training animals to detect and respond to target scents. The device includes a base, a rotatable carousel, and a spinner hub assembly that mechanically couples the carousel to the support base. The spinner hub assembly is configured to permit the carousel to rotate relative to the support base and to selectively lock the rotatable carousel in a selected position relative to base.

20 Claims, 13 Drawing Sheets

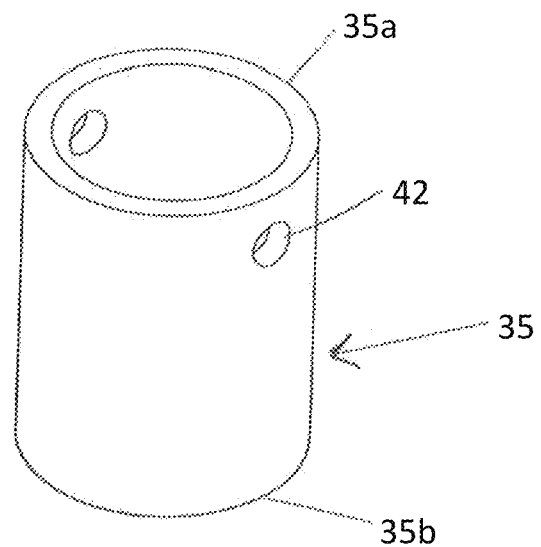
FIG. 13A
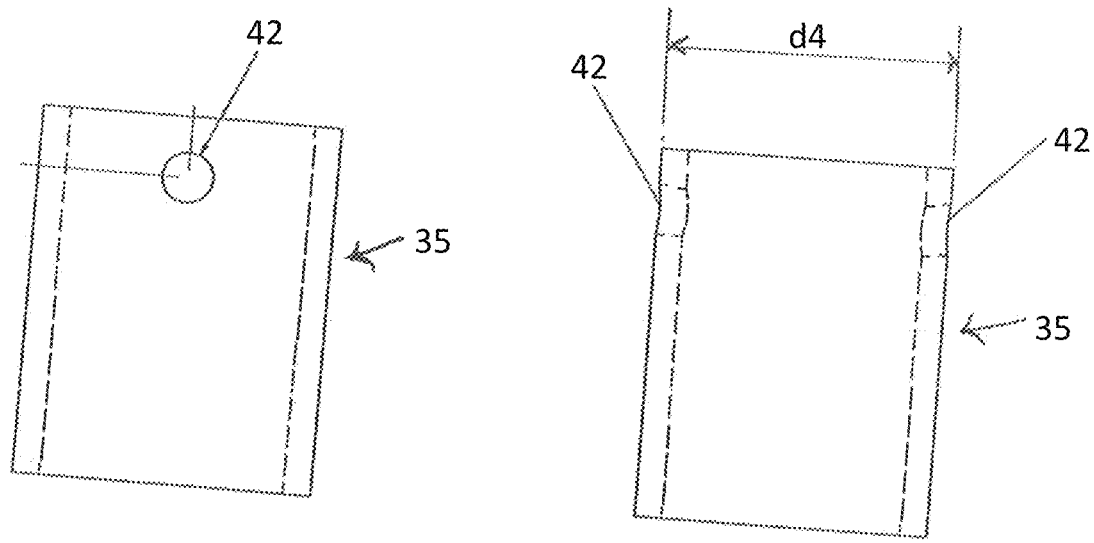
FIG. 13B
FIG. 13C

SCENT TRAINING WHEEL

FIELD OF THE INVENTION

Embodiments presented herein are generally directed to the training of animals to detect and respond to target scents/odors.

BACKGROUND OF THE INVENTION

Many animals, such as pigs, dogs, etc., have an acute sense of smell and are commonly used to detect "target" scents/odors, such as scents associated with drugs, explosives, biological substances, chemical substances, etc. For example, trained scent detection dogs are generally among the most reliable means for detecting dangerous or illegal materials, chemical materials, and/or biological materials by the scents which these materials emit and have the ability to do so at extremely low concentrations.

However, before being used to perform scent-based detection work, dogs or other animals must first be trained to use their acute sense of smell to detect target scents in a fast accurate and reliable manner. Presently, there are no technologies that are as accurate, fast, sensitive, mobile, and durable as the nose of a well-trained scent detection dog.

SUMMARY OF THE INVENTION

Accordingly, it is an object to provide a scent training wheel for training animals to detect and respond to target scents which includes a scent training carousel having a spinner hub assembly allowing for easy rotation of the rotatable carousel while permitting a trainer to lock the rotatable carousel when rotation is not desired.

It is another object to provide a method for training animals to detect and respond to target scents using a scent training wheel including a rotatable carousel having a spinner hub assembly allowing for easy rotation of the rotatable carousel while permitting a trainer to lock the rotatable carousel when rotation is not desired.

It is a further object to provide a scent training wheel for training animals to detect and respond to target scents which includes a rotatable carousel having a spinner hub assembly permitting the device to smoothly rotate with reduced friction without requiring lubrication or ball bearings.

It is still another object to provide a scent training wheel for training dogs to detect and respond to target scents which includes a rotatable carousel having a spinner hub assembly with a locking mechanism for precluding rotation of the rotatable carousel.

Still another object is to provide a scent training wheel for training dogs to detect and respond to target scents which includes a rotatable carousel having a spinner hub assembly with a height adjustment mechanism allowing easy height adjustment of the rotatable carousel.

Yet another object is to provide a scent training wheel for training dogs to detect and respond to target scents which includes a rotatable carousel having a retaining mechanism for quickly locking receptacles holding scent source material (target scent material) to the rotatable carousel in a secure manner while permitting the receptacles to be easily unlocked and removed from the rotatable carousel for subsequent cleaning and sterilizing.

In an alternative embodiment of the present invention, the scent training wheel for training dogs to detect and respond to target scents may have a rotatable carousel shaped as a turntable with a plurality of boxes affixed to the top surface of the turntable. The interior of each box may hold a receptacle containing odoriferous material (target scent material) and each box may include a removable cover having a large hole enabling a dog to introduce its nose completely into the box to detect target material scents.

Other objects, features and advantages of the embodiments presented herein will be apparent from the following detailed description taken in connection with the accompanying drawings, wherein like components are designated by like reference numerals.

BRIEF DESCRIPTION OF THE DRAWINGS

Embodiments of the present invention are described herein in conjunction with the accompanying drawings, in which:

FIG. 13A is a perspective view from above, left, illustrating the vertical hub pipe of the spinning hub assembly shown in FIG. 8 in accordance with certain embodiments presented herein.

FIGS. 13B and 13C are cross-sectional views illustrating the vertical hub pipe of the spinning hub assembly shown in FIG. 8.

DETAILED DESCRIPTION OF THE INVENTION

The following is a detailed description of exemplary embodiments such as those illustrated in the accompany drawings. The invention should not be understood as limited to specific embodiments described below.

It is intended that the description below not be limited to terms of orientation that are used for convenience and ease of understanding. Specifically, it is to be understood that terms such as "top", "bottom", "above", "below", "front", "rear", "side", "length", "width", "transverse", "upper", "lower", "interior", "exterior", "inner", "outer" and the like as may be used herein, merely describe points of reference and do not limit embodiment presented herein to any particular orientation or configuration.

Embodiments presented herein are generally directed to a scent training wheel for use in training a scent-detection animal. A scent training wheel in accordance with embodiments presented herein comprises a rotatable carousel/spinning member (rotatable carousel) and a plurality of scent holding receptacles/containers coupled to the rotatable carousel. The scent training wheel also comprises a support base that is connected to the rotatable carousel via a spinner hub assembly. The spinner hub assembly permits the rotatable carousel to rotate freely with respect to the base member (e.g., when a trainer/handler desires the rotatable carousel to rotate), yet precludes movement of the rotatable carousel while an animal is searching for target material. In certain embodiments, a scent training wheel also comprises a securing mechanism that detachably locks target scent source material (scent source samples) to the rotatable carousel such that, upon rotation of the rotatable carousel, the target scent source material remains coupled to the rotatable carousel, but may be easily and quickly manually removed by a trainer/handler for cleaning and sterilizing purposes. Although other scent-based training devices have been proposed for the training of scent-detection animals, none of these devices have, among other elements, the spinner hub assembly and the securing mechanism, as well as other elements of the scent training wheels, presented herein.

For ease of illustration, the scent training wheels in accordance with embodiments presented herein are primarily described herein with reference to the training of dogs. However, it is to be appreciated that these examples are merely illustrative and that the scent training wheels in accordance with embodiments presented herein may also be used for the scent imprinting of a number of other animals.

Figure 1:
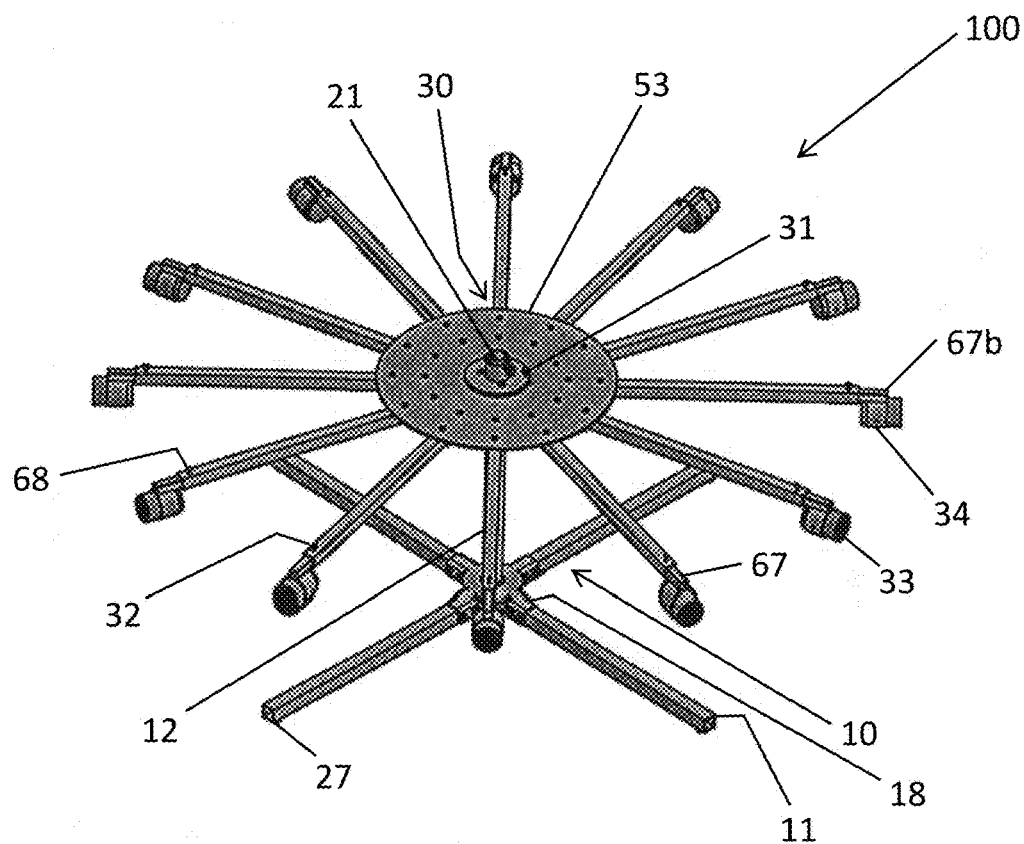
FIG. 1 illustrates a perspective view from above of a scent training wheel with a rotatable carousel attached in accordance with aspects of the presented herein.
Figure 2:
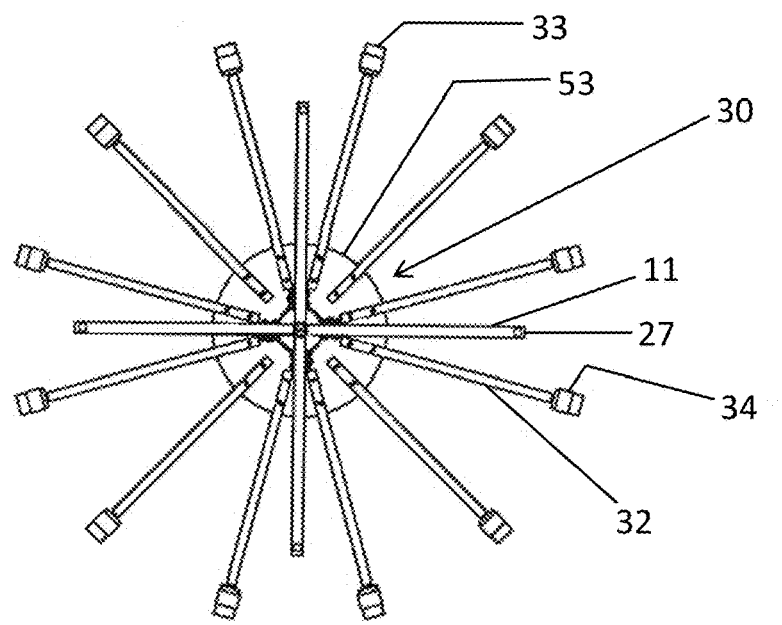
FIG. 2 illustrates a bottom view of the scent training wheel of FIG. 1 according to certain embodiments presented herein.
Figure 3:
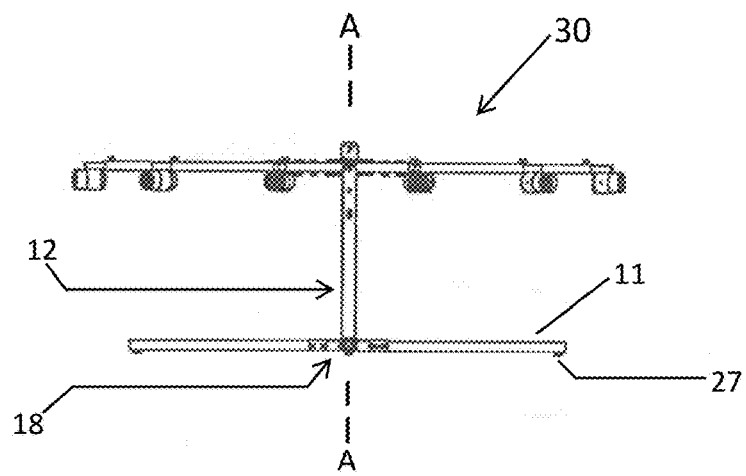
FIG. 3 illustrates a side view of the scent training wheel of FIG. 1 in accordance with certain embodiments presented herein.

Referring now to FIGS. 1, 2, and 3, shown is a scent training wheel 100 in accordance with certain embodiments presented herein. As shown, scent training wheel 100 comprises a support base 10 mechanically coupled to, and configured to support, a scent training rotatable carousel 30, sometimes referred to herein simply as a rotatable carousel. As described further below, the rotatable carousel 30 is mechanically coupled to the support base 10 via a spinner hub assembly 31 which enables the rotatable carousel 30 to rotate, relative to the support base 10, about a vertical axis. This vertical axis is shown in FIG. 3 as axis A-A.

Figure 4:
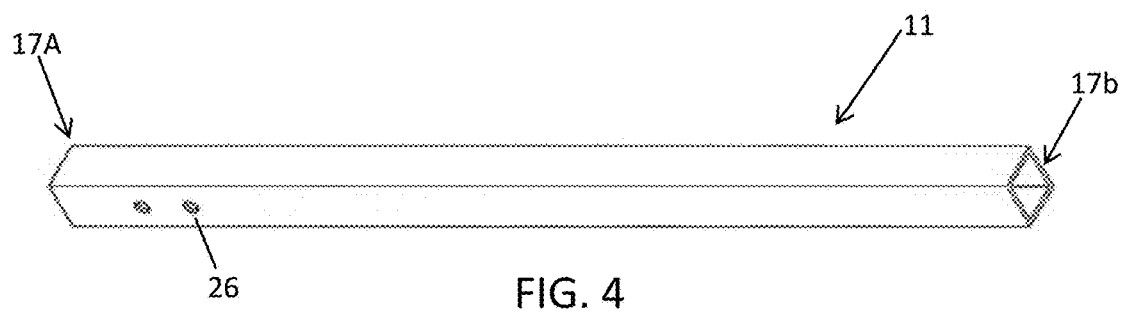
FIG. 4 is a perspective view from above, right, illustrating a support leg of the scent training wheel shown in FIG. 1 in accordance with certain embodiments presented herein.
Figure 5A:
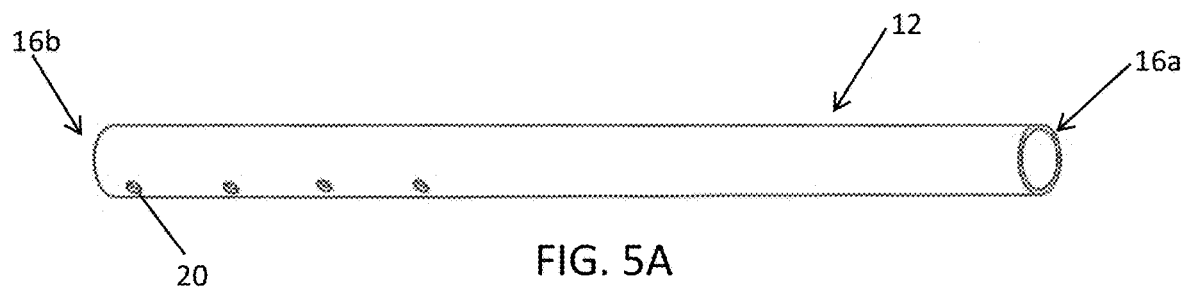
FIG. 5A is a perspective view from above, right, illustrating a vertical tubular post of the scent training wheel of FIG. 1 in accordance with certain embodiments presented herein.
Figure 5B:
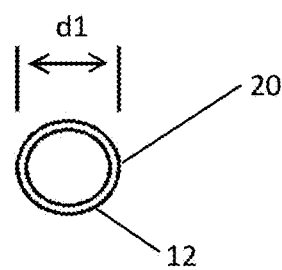
FIG. 5B is cross-sectional view illustrating the vertical tubular post shown in FIG. 5A in accordance with certain embodiments presented herein.

In the illustrated embodiment of FIGS. 1-5B, support base 10 includes four elongated (e.g., tubular) support legs 11 and an elongated cylindrical tubular post 12 which extends vertically upward from legs 11. Support legs 11, as shown in FIG. 4, can have, for example, a square cross-sectional configuration and cylindrical tubular post 12, as shown in FIG. 5B, can have, for example, a cylindrical cross-sectional configuration with an outer diameter $d_1$. However, the support legs and the tubular post can have other configurations, for example, support legs 11 can have a cylindrical cross-sectional configuration while tubular post 12 can have a square cross-sectional configuration. Further, support legs 11 extend horizontally outward from tubular post 12 (i.e., parallel to the rotatable carousel 30) to support the scent training wheel 100 on a floor, the ground, or any other support surface (not shown). The tubular post 12 has a first end 16a and second end 16b. Similarly, each tubular support leg 11 has a first end 17a and second end 17b. Once the base is assembled, support legs 11 extend transverse to vertical tubular post 12.

Figure 6A:
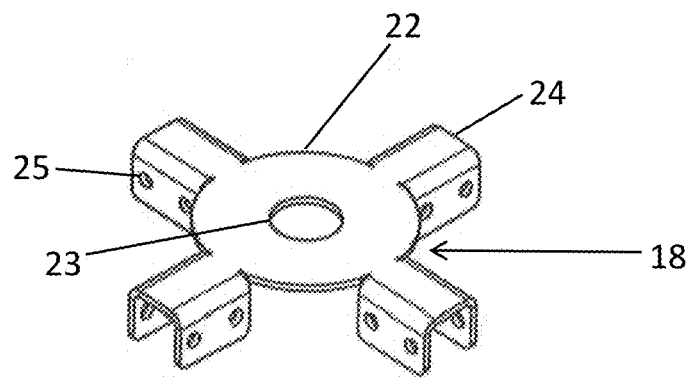
FIG. 6A is a perspective view from above, left, illustrating a base plate of the scent training wheel of FIG. 1 without the support legs of FIG. 4 attached in accordance with an aspect of certain embodiments presented herein.
Figure 6B:
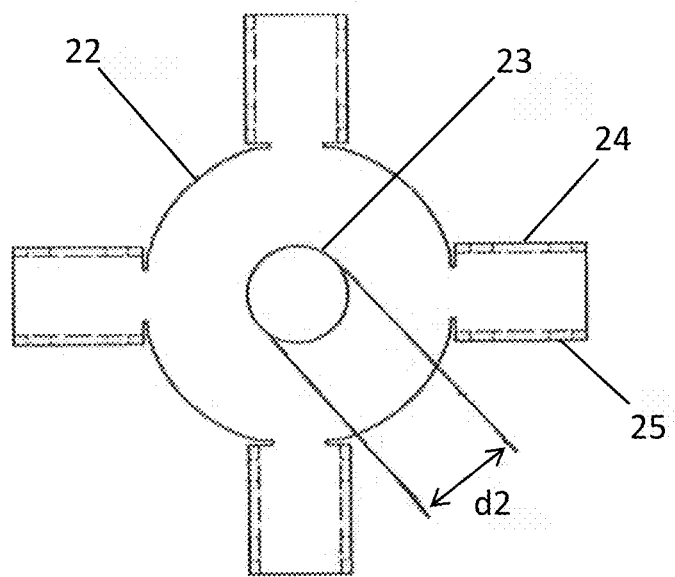
FIG. 6B is a top plan view illustrating the base plate shown in FIG. 6A in accordance with certain embodiments presented herein.

The first end 16a of tubular post 12 is attached to a base plate 18, which is shown in greater detail in FIGS. 6A-6B. However, before turning to the base plate 18, FIG. 5A illustrates that the second (distal) end 16b of tubular post 12 includes a plurality of apertures 20 that, in one example, are spaced a different distances from the edge of the distal end 16b. These different apertures enable the rotatable carousel 30 to be set at different heights (i.e., to enable height adjustable of the rotatable carousel). In the example of FIGS. 1-5B where the post 12 is tubular, apertures 20 are arranged in pairs, diametrically spaced (FIG. 5B) at opposing points on the tubular post. Moreover, as shown in FIG. 5A, the diametrically opposed pairs of apertures are equally spaced apart, however, other suitable spacing may be utilized, as desired. As further shown in FIGS. 1 and 3, a separable, unitary locking pin 21 (or other suitable locking mechanism) extends through a selected pair of diametrically spaced apertures in tubular post 12 to retain training rotatable carousel 30 at a selected height as will be described in more detail below.

As noted, FIGS. 1-5B illustrate the use of a tubular post 12 having a cylindrical cross-sectional shape. It is to be appreciated that the post may have other arrangements that dictate the use of different types of apertures and/or apertures having different locations. For example, the post could alternatively be a solid rod and the apertures 20 would be single through-holes. In another example, the post could have a square or rectangular cross-sectional shape and the apertures 20 could be disposed on diametrically opposite surfaces of the post.

Referring next to FIGS. 1 and 6A-6B, the base plate 18 includes a center portion 22 of a circular configuration which comprises a central aperture 23 of diameter $d_2$ (FIG. 6B) extending therethrough. The diameter $d_2$ of central aperture 23 is slightly larger than the outer diameter $d_1$ of tubular post 12. Central aperture 23 has a circular configuration such that first end 16a of the tubular post may be received within central aperture 23 and affixed thereto by any suitable mechanisms/technique, such as welding or the like. A plurality of equally spaced apart U-shaped channel brackets 24 extend outward from the peripheral edge of center portion 22. The opposed side walls of each channel bracket 24 include through-holes 25.

Referring now to FIG. 4, shown are further details regarding attachment of the legs 11 to the base plate 18. More specifically, FIG. 4 illustrates that each tubular support leg 11 has holes 26 arranged in pairs, diametrically spaced adjacent to first end 17a. Each U-shaped channel bracket 24 receives, in interfitting fashion, end 17a of support leg 11 such that the diametrically spaced pairs of holes 26 are in alignment with through-holes 25 in U-shaped channel bracket 24. Suitable fasteners are provide for insertion into the aligned holes for attachment of each support leg 11 to the base plate 18 (FIGS. 1-3). Thus, support legs 11 may be easily detached from base plate 18 to facilitate transport and storage of the scent training wheel 100 by removal of the fasteners.

As further illustrated in FIGS. 1-3, a leveler foot 27 is affixed adjacent second end 17b of each support leg 11. The leveler foot 27 is attached to a wall surface of the support leg facing the floor or other such support surface for adjustably leveling the scent training wheel 100. The support legs, as well as the tubular post and base plate, may be fabricated from relatively lightweight rigid material, such as for example aluminum or aluminum alloy. However, these components may be fabricated from other suitable non-corrosive metals or plastic materials.

Again referring to FIGS. 1-3, the rotatable carousel 30 is mechanically coupled to the base 10 via a spinner hub assembly 31 and is coupled to a plurality of elongated radially extending support arms 32. Each of the supports arms 32 is coupled to a corresponding scent receptacle 33 (e.g., cup) via a corresponding ring-shaped sleeve member 34. As shown in greater detail in FIGS. 7-14B, the spinner hub assembly 31 includes a number of components which allow the rotatable carousel 30 to be supported on the distal free end 16b of elongated vertical tubular post 12 and to smoothly rotate about the tubular post. For ease of illustration, FIGS. 7-14B will be described together.

Figure 14A:
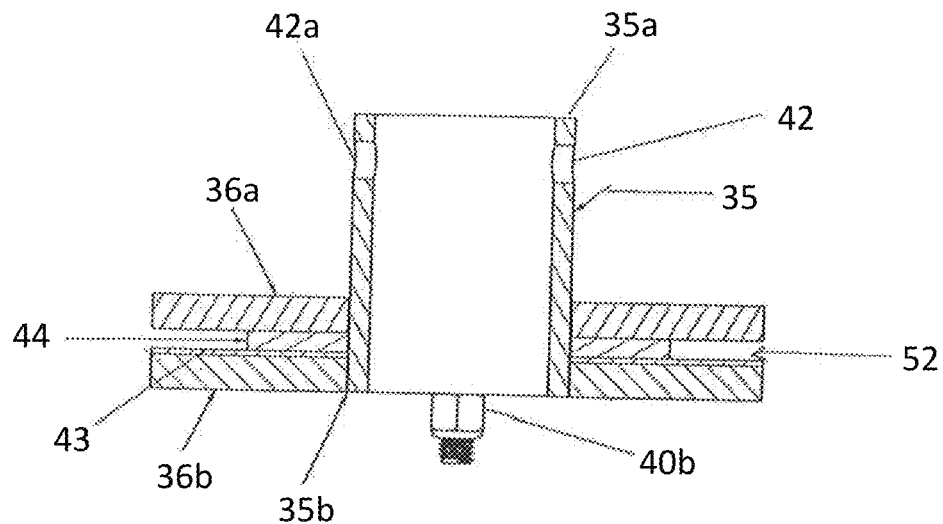
FIG. 14A illustrates a cross-sectional view of the assembled spinning hub assembly shown in FIG. 8 without the rotating plate positioned between the top and bottom plates in accordance with certain embodiments presented herein.

In accordance with certain embodiments presented herein, spinner hub assembly 31 includes a hollow core tubular hub pipe 35 having, for example, a cylindrical configuration and axially opposed ends 35a, 35b (shown in FIGS. 13A, 14A). The spinner assembly 31 also comprises an annular top plate 36a, an annular bottom plate 36b, which is substantially similar to the top plate (FIG. 10), an annular washer (rider) plate 43 (FIG. 11), an annular center plate 44 (FIG. 12), and an annular rotary plate 53 (FIG. 9). As may be seen in FIG. 8, as well as in FIGS. 14A-14B, washer plate 43, center plate 44, and rotary plate 53 are disposed (e.g., sandwiched) between top and bottom plates 36a, 36b, when the top and bottom plates are securely fastened together using suitable fastening elements, such as for example screws/bolts 40a and locknuts 40b. In certain examples, the screws/bolts 40a and locknuts 40b may comprise button head socket cap screws and nylon-insert locknuts.

Figure 7:
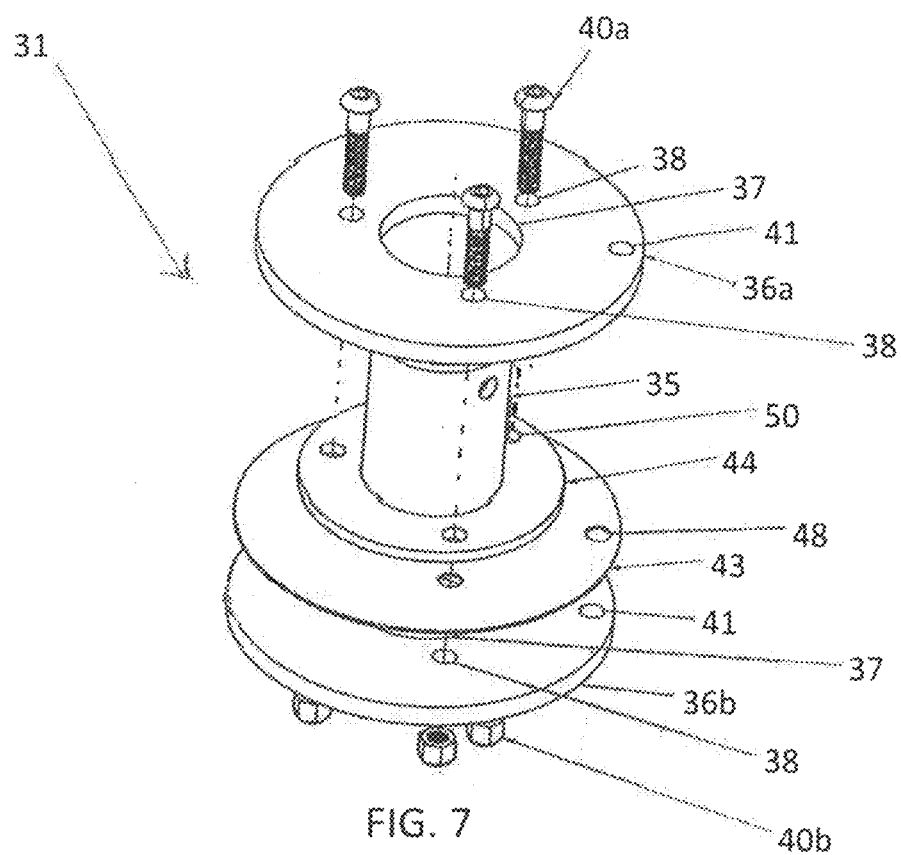
FIG. 7 is an exploded perspective view from above, left, illustrating a spinner hub assembly of the rotatable carousel shown in FIG. 1 according to an aspect of certain embodiments presented herein.
Figure 10:
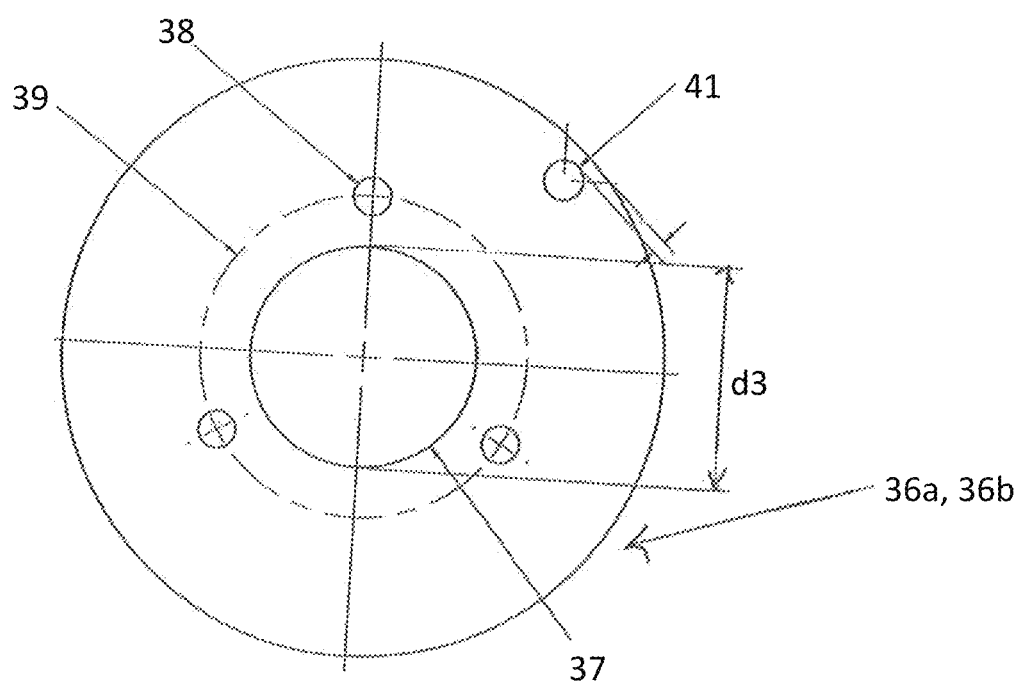
FIG. 10 is a top plan view illustrating the top plate of the spinner hub assembly shown in FIG. 7 according to certain embodiments presented herein.

Referring specifically to FIGS. 7 and 10, each top and bottom plate 36a, 36b has a body portion formed with a substantially similar circular central hub receiving aperture 37 of diameter $d_3$ (FIG. 10) and an array of substantially similar equally spaced through-holes 38 of circular configuration positioned on a reference circle 39 extending about central hub receiving aperture 37. The through-holes 38 are configured to receive screws/bolts 40a (or other suitable fastening elements). In addition, each plate 36a, 36b is formed with a circular through-aperture 41 located at a point adjacent to the outer periphery of the plate configured to receive a locking pin 90 (or other suitable locking mechanism). While the top and bottom plates illustrated in FIGS. 7 and 10 are shown as having three equally spaced apart screw receiving holes 38 and one locking pin aperture 41, it is to be appreciated that any other suitable number of screw receiving holes and locking pin apertures may be used. Furthermore, top and bottom plates 36a, 36b, as well as tubular hub pipe 35, are fabricated from a suitably strong and rigid material such as a metal (e.g., aluminum, an aluminum alloy, etc.). However, these components may be fabricated from any other suitable material such as plastic if so desired.

Figure 14B:
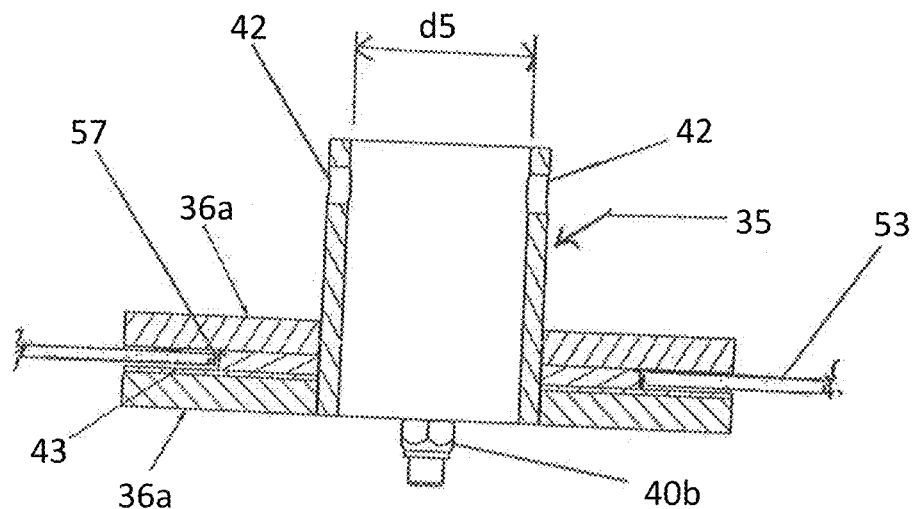
FIG. 14B illustrates a cross-sectional view of the assembled spinning hub assembly shown in FIG. 8 with the rotating plate positioned between the top and bottom plates in accordance with certain embodiments presented herein.

In the embodiment shown in FIGS. 7-14B, the hollow tubular hub pipe 35 has an outer diameter $d_4$ (FIG. 13C) which is slightly less than diameters $d_3$ of central aperture 37 in each plate 36a, 36b such that tubular hub pipe 35 may fit concentrically within each central aperture 37. The end 35b of the hub pipe is affixed within the central aperture of bottom plate 36b by a weld joint (or other suitable fastening mechanism) and is thus integral with the latter (FIGS. 14A-14B). The opposite end 35a of hub pipe 35 is provided with a pair of diametrically spaced holes 42 extending through the tubular wall of the hub (FIGS. 8, 13A-13C and 14A-14B). The through-holes 42 have a similar configuration as apertures 20 in tubular post 12 to receive the quick release pin 21 (FIG. 1). The inner diameter $d_5$ of hollow tubular hub pipe 35 (FIG. 14B) has a slightly larger dimension than the outer (outside) diameter $d_1$ of the tubular post 12 to permit sliding insertion of the tubular post into the interior of tubular hub pipe 35. The diametrically spaced holes 42 of hub pipe 35 are selectively registrable with pairs of diametrically spaced apertures 20 of tubular post 12 at different adjusted heights of the rotatable carousel. Upon selective registration of diametrically spaced holes 42 with diametrically spaced apertures 20, the quick release pin 21 is inserted through the paired holes/apertures to secure rotatable carousel 30 to base 10.

Figure 11:
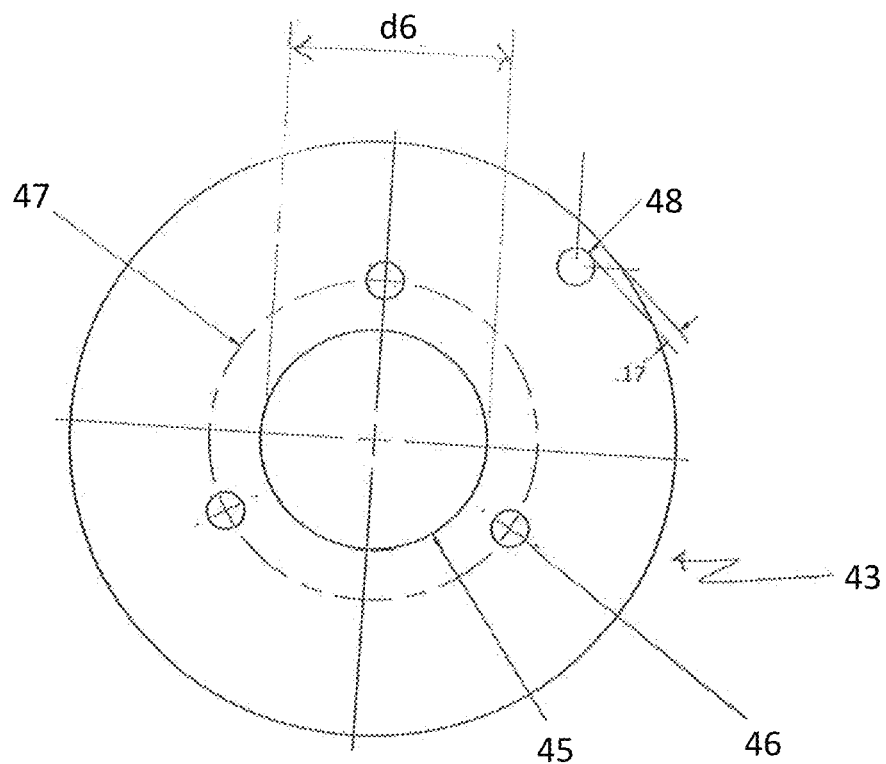
FIG. 11 is a top plan view illustrating the washer plate of the spinner hub assembly shown in FIG. 7 in accordance with an aspect of certain embodiments presented herein.

Referring to FIGS. 7 and 11, the washer or rider plate 43, other than being fabricated from thin plastic material (to be described below), is configured in a manner that is substantially similar to top and bottom plates 36a, 36b. Specifically, washer/rider plate 43 has a body portion formed with a circular central hub receiving aperture 45 of diameter $d_6$ (FIG. 11) extending through the plate; an array of substantially similar equally spaced through-holes 46 of circular configuration positioned on a reference circle 47 extending about the central hub receiving aperture; and a circular through-aperture 48 located at a point adjacent the periphery of plate 43. The location of the circular central hub receiving aperture, the array of circular bolt holes, and the locking pin aperture in washer (rider) plate 43 corresponds to the location of the circular central hub receiving aperture 37, the array of circular bolt holes 38, and the locking pin aperture 41 in each top and bottom plate 36a, 36b. Thus, the array of through-holes 46 is alignable with the array of through-holes 38 to receive screws/bolts 40a (or other suitable fasteners) and the circular through-aperture 48 is alignable with apertures 41 to receive locking pin 90 as described above.

In addition, the diameter $d_6$ of central hub aperture 45 in washer plate 43 (FIG. 11) is substantially the same as the diameter $d_3$ of central hub aperture 37 in each top and bottom plate 36a, 36b (FIG. 10). Accordingly, the diameter $d_6$ of central hub aperture 45 is slighter larger than the outer diameter $d_4$ of tubular hub pipe 35, thus allowing the tubular hub pipe to slidably fit concentrically within the central hub receiving aperture 45.

As mentioned above, the washer/rider plate 43 is fabricated from plastic material such as for example a thermoplastic polymer resin (e.g., polyoxymethylene (POM), also known as acetal, polyacetal and polyformaldehyde). The inventor has found that fabricating the washer (rider) plate from thermoplastic polymer resin, such as (but not limited to) polyoxymethylene (POM), provides a precision, high-performance component having the characteristics of high stiffness, low friction, and excellent dimensional stability. Moreover, the inventor has found that fabricating rider plate 43 of thermoplastic polymer resin enables the rotatable carousel 30 to smoothly rotate about vertical tubular post 12 with reduced friction without requiring lubrication or ball bearings.

Figure 12:
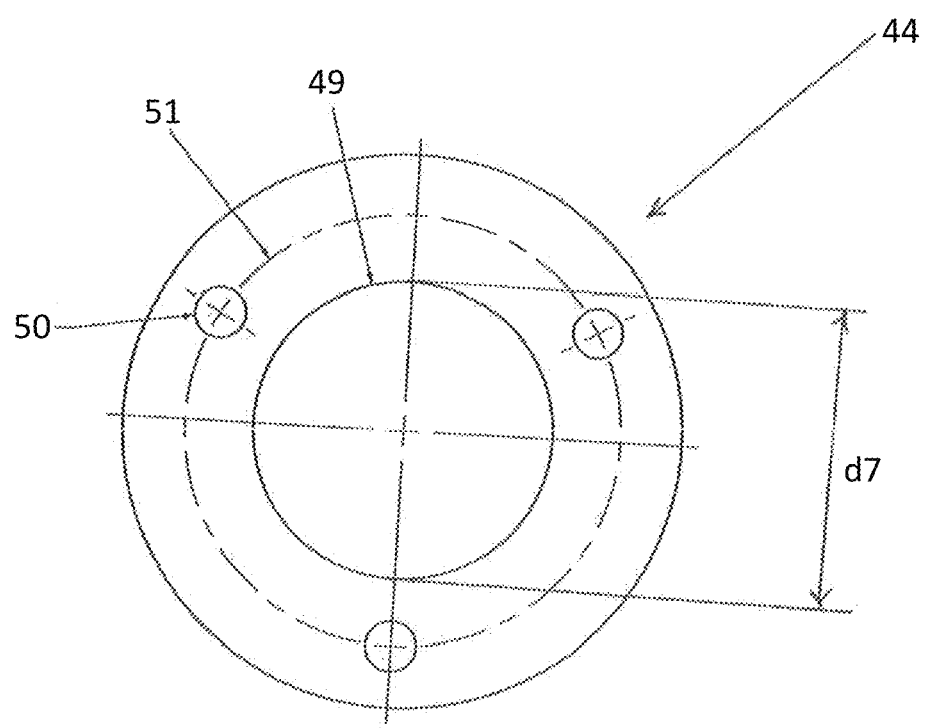
FIG. 12 is a top plan view illustrating the center plate of the spinner hub assembly shown in FIG. 7 according to an aspect of certain embodiments presented herein.

Referring now to FIGS. 7 and 12, the center plate 44 has a circular configuration that is substantially smaller than the circular configuration of washer (rider) plate 43 and top/bottom plates 36a, 36b. As shown in FIG. 12, center plate 44 has a body portion formed with a circular central hub receiving aperture 49 of diameter $d_7$ (FIG. 12) extending through the plate and an array of substantially similar equally spaced through-holes 50 of circular configuration positioned on an reference circle 51 extending about the central hub receiving aperture. The location of the circular central hub receiving aperture and the array of circular bolt holes in center plate 44 corresponds to the location of circular central hub receiving apertures 37, 45 and the array of bolt holes 38, 46 in top and bottom plates 36a, 36b and washer/rider plate 43, respectively (FIG. 7). Thus, the array of through-holes 50 is alignable with the array of through-holes 38 in plates 36a, 36b and the array of through-holes 46 in plate 43 to receive the screws/bolts 40a (or other suitable fasteners) as shown in FIG. 7.

In accordance with the embodiment shown in FIGS. 7 and 12, the diameter $d_7$ of circular central hub receiving aperture 49 in center plate 44 is substantially the same as the diameter $d_6$ of central hub aperture 45 in washer plate 43 and diameter $d_3$ of central hub aperture 37 in top and bottom plates 36a, 36b. Thus, diameter $d_7$ of central hub aperture 49 is also slighter larger than the outer diameter $d_4$ of the tubular hub pipe 35, thereby allowing the tubular hub pipe to slidably fit concentrically within circular central hub receiving aperture 49. Further, the center plate 44 is fabricated from a suitably strong and rigid material such as a metal (e.g., aluminum, aluminum alloy, etc.). However, center plate 44 may be fabricated from any other suitable material such as plastic.

Figure 8:
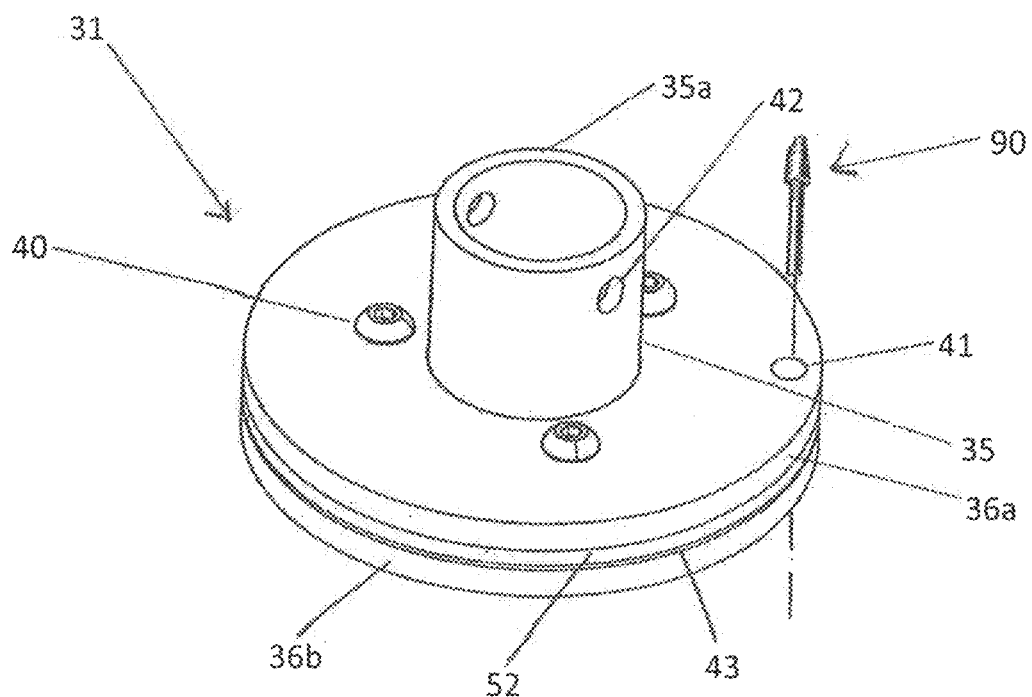
FIG. 8 illustrates an assembled perspective view from above, right, of the spinner hub assembly shown in FIG. 7.
Figure 9:
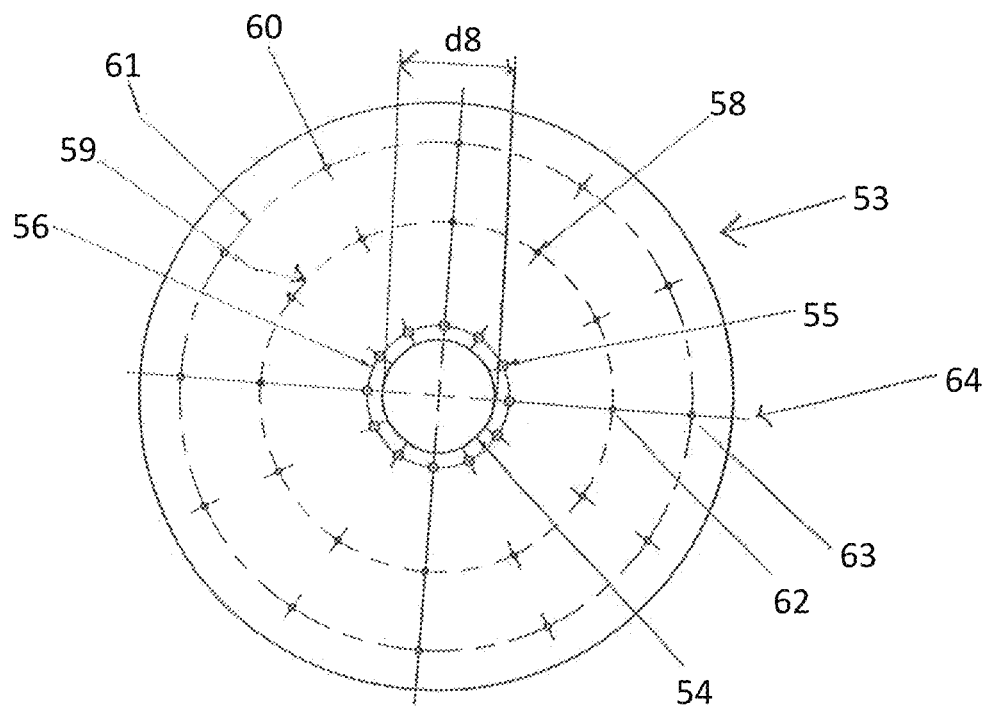
FIG. 9 is a top plan view illustrating the rotary plate of the spinner hub assembly shown in FIG. 1 without the support arms attached in accordance with certain embodiments presented herein.

With reference to FIG. 8, as well as FIGS. 14A-14B, when spinner hub assembly 31 is in its assembled configuration, center plate 44 provides a circular gap 52 between top plate 36a and washer/rider plate 43 extending from the outer periphery of center plate 44 to the outer periphery of top/bottom plates 36a, 36b and washer/rider plate 43 (see FIG. 14A). Again, the diameters $d_3$, $d_6$ and $d_7$ of central hub receiving apertures 37, 45, 49 in top/bottom plates 36a, 36b, washer (rider) plate 43 and center plate 44, respectively, are each slightly larger than the outer dimension (outside diameter $d_4$) of tubular hub pipe 35 to provide sufficient space for the tubular hub (pipe) to smoothly slide through each of the circular central hub receiving apertures upon assembly of spinner hub assembly 31.

In accordance with the embodiment of the invention shown in FIGS. 9 and 14B, the rotary plate 53 has a circular body portion substantially larger than the body portion of each top and bottom plate 36a, 36b and washer (rider) plate 43. In addition, the body portion of rotary plate 53 has a thickness which is minimally less (e.g., approximately in the range of $\frac{1}{1000}$ to $\frac{3}{1000}$ inch less) than the height of gap 52 created by center plate 44 between top plate 36a and washer/rider plate 43.

Referring now to FIG. 9, the rotary plate 53 has a body portion formed with a circular central receiving aperture 54 of diameter dg extending through the plate and a series of through-holes 55 of circular configuration positioned on an imaginary circle 56 adjacent to and extending about central hub receiving aperture 54 to receive the previously described locking pin 90 upon alignment of any one of the series of through-holes 55 with locking pin aperture 41 in top and bottom plates 36a, 36b and locking pin aperture 48 in washer plate 43. In accordance with the embodiment of the invention shown in FIG. 9, a series of twelve equally spaced apart through-holes 55 is formed in the rotary plate. The number of holes 55 corresponds to the number of radially extending support arms 32 fastened to the rotary plate, as may be seen in FIG. 1. The diameter dg of central receiving aperture 54 is slightly larger than the outside diameter of center plate 44 such that, upon assembly of the various components of spinner hub assembly 31, center plate 44 easily fits within central receiving aperture 54 and provides a shoulder 57 around which rotary plate 53 may smoothly rotate.

Again with reference to FIG. 9, the body portion of rotary plate 53 is formed with two additional series of circular through-holes. The first series of circular holes 58 is distributed on an imaginary circle 59 extending about central hub receiving aperture 54 that is located a first distance from the center of circular hub receiving aperture 54. The second series of circular holes 60 is distributed on an imaginary circle 61 extending about central hub receiving aperture 54 that is located a second distance from the center of circular hub receiving aperture 54. As may be seen in FIG. 9, the second distance is greater than the first distance. Moreover, the series of holes 58 on imaginary circle 59 is distributed at a plurality of points 62 located at the intersection of radii 64 and of concentric circle 59. Similarly, the series of holes 60 on imaginary circle 61 is distributed at a plurality of points 63 located at the intersection of radii 64 and of concentric circle 61.

Figure 15:
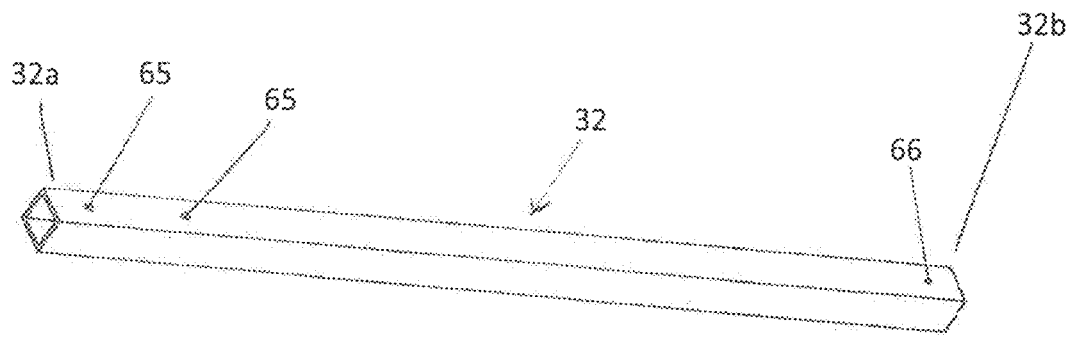
FIG. 15 is a perspective view from above, left, illustrating a support arm of the rotatable carousel shown in FIG. 1 in accordance with an aspect of certain embodiments presented herein.

Referring again to FIGS. 1-3, the elongated support arms 32 of the rotatable carousel are connected to rotary disc 53 via the series of through-holes 58, 60. As shown in FIG. 15, each support arm 32 is formed as an elongated hollow tube of square cross-sectional configuration and has first and second opposed ends 32a, 32b. A pair of spaced apart holes 65 extends through a wall of each support arm at end 32a, and another hole 66 extends through the same wall at opposed end 32b. The spacing between holes 65 in each support arm 32 corresponds to the spacing between through-holes 58, 60 in rotary plate 53. To connect the support arms 32 to rotary disc 53, each support arm is positioned adjacent the lower side of the rotary disc (FIG. 2) and holes 65 are aligned with respective through-holes 58, 60. Threaded fasteners (not shown) are inserted into the aligned holes and tighten to securely fasten support arms 32 to the rotary plate. The attached support arms 32 extend radially outward from rotary plate 53 and define radii of a first imaginary circle. Additionally, the use of threaded fasteners enables elongated support arms 32 to be detachable from spinner hub assembly 31 to facilitate transport and storage of the scent training wheel 100.

Figure 16:
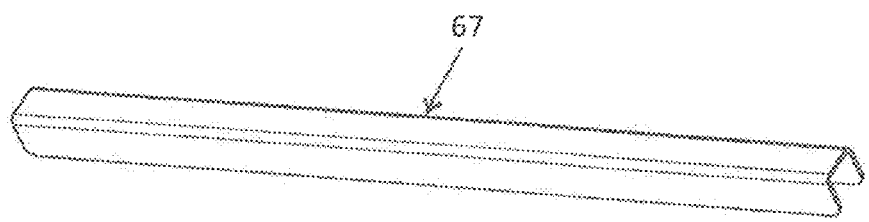
FIG. 16 is a perspective view from above, right, illustrating an extension support arm of the rotatable carousel shown in FIG. 1 in accordance with an aspect of certain embodiments presented herein.

As illustrated in FIGS. 1 and 16, the radially extending support arms 32 each include an elongated U-shaped extension support arm 67 configured to be telescopically received within the interior cavity of the hollow core support arm. The extension support arms may be slid outward from within support arms 32 to various extended positions and, upon being extended, define radii of a second imaginary circle having an increased circumference. Moreover, a suitable locking mechanism, such as a locking screw 68, (FIG. 1) may be threaded into hole 66 of each support arm 32 to secure extension support arms 67 in their extended and retracted positions. In accordance with the embodiment shown in FIG. 1, twelve radially extending support arms 32 are attached to rotary plate 53. Having the ability to increase the circle circumference of support arms 32 by sliding the telescoping extension support arms 67 outward is advantageous because it lengthens the distance between distal ends of adjacent support arms to create optimum spacing between the twelve support arms to enable an animal (e.g., dog) being trained to walk around the rotatable carousel and search for target and non-target material scents emitted from receptacles 33 without shortening its stride. In addition, providing optimum spacing between receptacles 33 attached to the distal end of extension support arms 67 makes it easier for an animal (e.g., dog) being trained to isolate and detect target material scents and non-target material scents wafting from the receptacles. It is to be appreciated that the use of twelve extension support arms 67 is illustrative and that other embodiments may include different numbers of arms. It is also to be appreciated that only a subset of extension support arms 67 may be used at a given time (e.g., less arms may be used for less experienced animals).

Figure 17A:
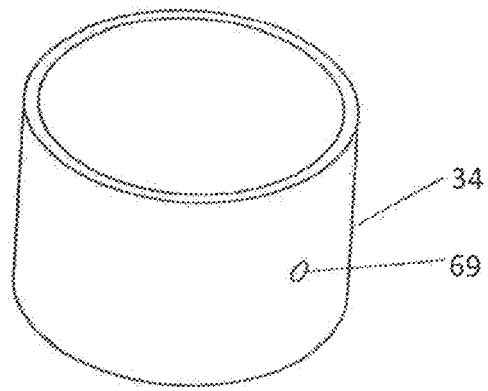
FIG. 17A is a perspective view from above, right, illustrating a receptacle sleeve of the rotatable carousel shown in FIG. 1 according to an aspect of certain embodiments presented herein.
Figure 17B:
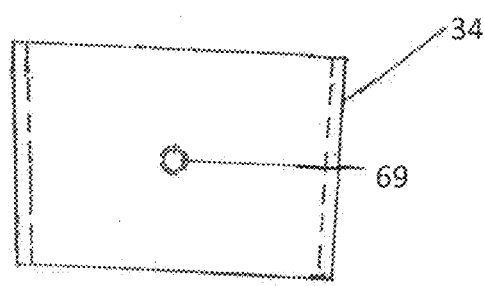
FIG. 17B illustrates a cross-sectional view of the receptacle sleeve shown in FIG. 17A.

As illustrated in FIG. 1 and FIGS. 17A-17B, a ring-shaped sleeve member 34 is attached to the outer projecting distal end 67b of extension support arms 67 by any suitable mechanism/technique, such as welding or the like. Each ring-shaped sleeve member may have a tapered cylindrical wall with an inner surface defining a cavity with open ends for slidably receiving a tapered receptacle (cup) 33 in which is placed either scent emitting target material or scent emitting non-target material. In one embodiment, the circumference of each ring-shaped sleeve member may be adjustable to accommodate various sized tapered receptacles (cups) 33. The cylindrical wall of each sleeve member 34 includes a threaded through-aperture 69 for receiving a threaded fastener (not shown) such as, for example, a threaded thumb screw, although other types of fasteners may be used in alternative embodiments. The sleeve members 34 may be fabricated from a thin metal or plastic material which may be easily cleaned and sanitized, such as (but not limited to) stainless steel.

Figure 18:
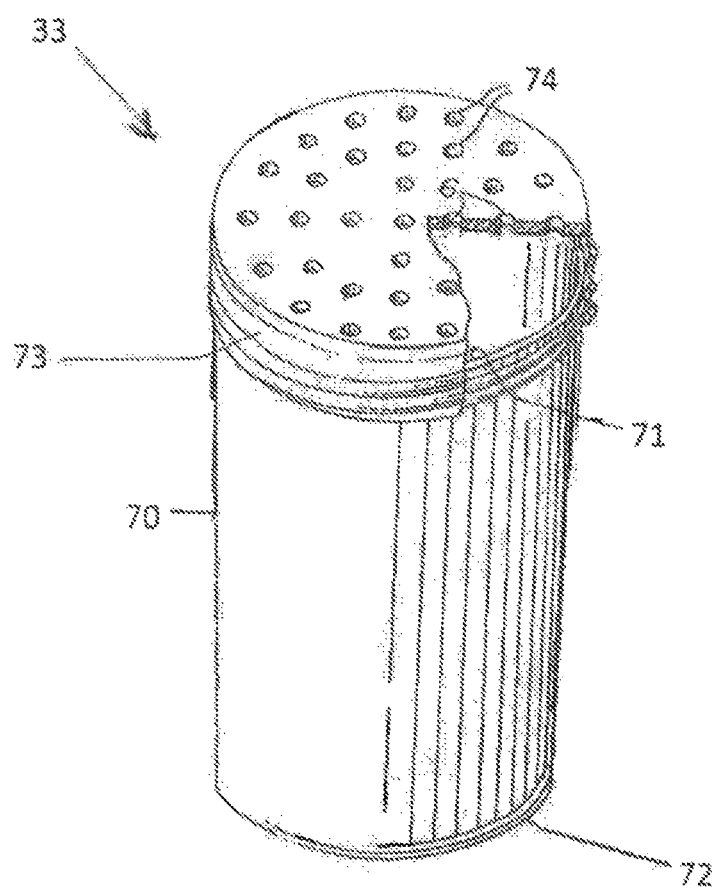
FIG. 18 illustrates a perspective view from above, left, of an exemplary receptacle for holding target material as shown in FIG. 1 in accordance an aspect of certain embodiments presented herein.

In accordance with the embodiment shown in FIG. 18, the receptacles (cups) 33 comprise an elongated body of thin aluminum or other thin metal or plastic material having a tapered cylindrical wall 70 with an outer surface. The tapered cylindrical wall of the receptacles (cups) gradually narrows from a first open end 71 to a second closed end 72. The cylindrical wall further defines an interior cavity in which is placed scent emitting target or non-target material. A removable cap 73 is secured to the open upper end 71 of the receptacle by any suitable retaining mechanism, such as (but not limited to) threading adjacent open upper end 71. The removable cap 73 includes an array of through-holes 74 to permit scents from target and non-target material placed within the receptacles (cups) to waft out into the air for detection by a dog being trained. The receptacles (cups) may resemble commercial salt shaker cups used by chefs in restaurant kitchens.

The interior cavity defined by the open ended tapered cylindrical wall of sleeve member 34 has a dimension larger than the narrow closed end 72 but smaller than the open upper end 71 of the receptacle, thereby allowing receptacles (cups) 33 to be slid into sleeve member 34 up to a point where the outer surface of the receptacle tapered cylindrical wall engages the inner surface of the tapered cylindrical wall of the sleeve member to establish a frictional interference fit (e.g., a compression fit) between the two components. While the friction/compression fit is usually sufficient to retain receptacle (cup) 33 within sleeve 34 during rotation of rotatable carousel 30 about vertical tubular post 12, the threaded fastener (mentioned above but not shown) may be advanced into the interior of the sleeve via threaded through-aperture 69 until a tip of the threaded fastener engages the outer surface of receptacle (cup) 33 to more securely attach the receptacle (cup) within sleeve member 34. The threaded fastener assures a trainer (handler) using the scent training wheel 100 that the receptacles (cups) will not fly off the distal end 32b of support extension arms 67 during rapid, repetitious spinning of rotatable carousel 30.

After a training session is completed, the receptacles (cups) 33 may be easily removed from ring-shaped sleeve members 34 for cleaning and sanitizing (e.g., removal of lingering target and non-target scents, as well as lingering animal scents and other contamination) by loosening the threaded fastener (if used to more securely retain receptacles (cups) 33 within sleeve member 34, as described above) and forcefully pulling the receptacle (cup) outwardly from within the interior cavity of the sleeve member. In a similar manner, the ring-shaped sleeve members 34 may be cleaned and sanitized to remove lingering target and non-target scents, as well as lingering animal scents and other contamination, by sliding the telescoping extension support arms 67 with attached sleeve members 34 completely out from within the interior cavity of support arms 32.

Use and operation of the scent training wheel 100 is believed to be apparent from the above description. Nevertheless, a brief explanation of the use and operation of the scent training wheel will be provided below.

The rotatable carousel 30 is mounted to the second (distal) end 16b of upstanding tubular post 12 for rotation about a vertical axis of the post (FIG. 1). Specifically, the tubular hub pipe 35 of spinner hub assembly 31 is slid onto the distal end of upstanding post 12 and adjusted to a selected height by positioning diametrically spaced holes 42 in registration with a pair of diametrically spaced holes 20. Once holes 20, 42 are in registration, a user inserts locking pin 21 through the aligned holes to securely affix training rotatable carousel 30 to base 10 at the selected height. This provides a positive locked connection which will not slip. However, training rotatable carousel 30 is easily detachable from tubular post 12 by withdrawing locking pin 21 to facilitate transport and storage of the scent training wheel 100.

To change the selected height of the rotatable carousel, the user merely withdraws locking pin 21 to disengage it completely from the tubular post holes 20. After raising or lowering the rotatable carousel to a new height adjustment where diametrically spaced holes 42 in spinner hub pipe 35 are in registration with a new pair of diametrically spaced holes 20 in tubular post 12, the user reinserts locking pin 21 through the registered holes to again provide a positive non-slip locked connection.

A user attaches receptacles (cups) 33 to support arms 32 by slidably inserting the narrow closed end 72 of each receptacle into a respective ring-shaped sleeve member 34 until a frictional interference fit (e.g., compression fit) is achieved. The friction/compression fit provides a positive locking connection that is usually sufficient to retain receptacle (cup) 33 within ring-shaped sleeve member 34 during rotation (spinning) of the training rotatable carousel about the vertical axis AA of upstanding post 12. Optionally, however, the thumb screw (previously described above but not shown) may be threaded through-aperture 69 until a tip of the threaded fastener engages the outer surface of receptacle (cup) 33. This engagement provides a further positive locking connection that insures retention of the receptacle within circular sleeve 34 during rapid, repetitious rotation (spinning) of rotatable carousel 30. Scent emitting target and non-target material is usually placed within the receptacles prior to the receptacles being secured within ring-shaped sleeve members 34. However, the target/non-target material may be placed within the receptacles after the receptacles/cups are positioned with the sleeve members. Further, each extension support arm 67 optionally may be slid outward from its telescopically received location within support arms 32 to adjust the distance between adjacent support arms 32 as discussed earlier.

Usually during training of an animal (e.g., a dog) to detect and respond to scent emitting target material placed within one or more of the receptacles (cups) 33, rotatable carousel 30 is rotated by a user (e.g., trainer or handler) about axis A-A of the vertical tubular post 12 such that the receptacles containing the target and non-target material are positioned at random locations. However, while training an animal to detect the scent emitting target material, the dog may bump into or push the receptacles (cups) which results in the receptacles (cups) rotating in a circle about axis A-A of the vertical tubular post 12. The continuous rotation of the receptacles (cups) makes it difficult for the animal to detect and respond to target material scents. In order to overcome this problem, a trainer (handler) may at times need to securely lock rotatable carousel 30 from rotating about axis A-A of tubular post 12 so the receptacles (cups) in which the scent emitting target and non-target material are placed remain in a predetermined position. Therefore, to enable rotatable carousel 30 to be locked in a predetermined position, the spinner hub assembly 31 is provided with a locking mechanism to prevent rotation of the rotatable carousel about axis A-A of tubular post 12.

Accordingly, as previously described, the tubular hub pipe 35, which is integrally attached by welding to bottom plate 36b, receives in sliding sequence washer (rider) plate 43, center plate 44, rotary plate 53, and top plate 35a (FIG. 7). Top and bottom plates 36a, 36b, as well as washer plate 43 and center plate 44, each have an array of through-holes 38, 46, and 50, respectively, formed at corresponding locations that, upon being placed in alignment, receive screws/bolts 40a for threaded engagement with locknuts 40b (FIGS. 7 and 14A-14B) to secure these components together as a unit. In addition, once these components are secured together, top and bottom plates 36a, 36b, as well as washer plate 43, have aligned through-apertures 41, 48, respectively, formed at corresponding points adjacent to the outer periphery of the plates which are configured to receive locking pin 90 (FIG. 7).

In accordance with the embodiment shown in FIG. 9, rotary plate 53 has a series of through-holes 55 (i.e., twelve equally spaced apart through-holes) positioned at locations extending about central hub receiving aperture 54 that, upon alignment with through-apertures 41, 48 in top and bottom plates 36a, 36b and washer (rider) plate 43, respectively, are configured to receive locking pin 90. Thus, when a user (e.g., a trainer or handler) inserts locking pin 90 through aperture 41 in top plate 36a, one hole of the series of holes 55 in rotary plate 53, and aperture 41 in bottom plate 36b, rotatable carousel 30 is precluded from rotating about axis A-A of upstanding tubular post 12 until locking pin 90 is completely withdrawn and disengaged from spinner hub assembly 31 (FIG. 8).

Figure 19:
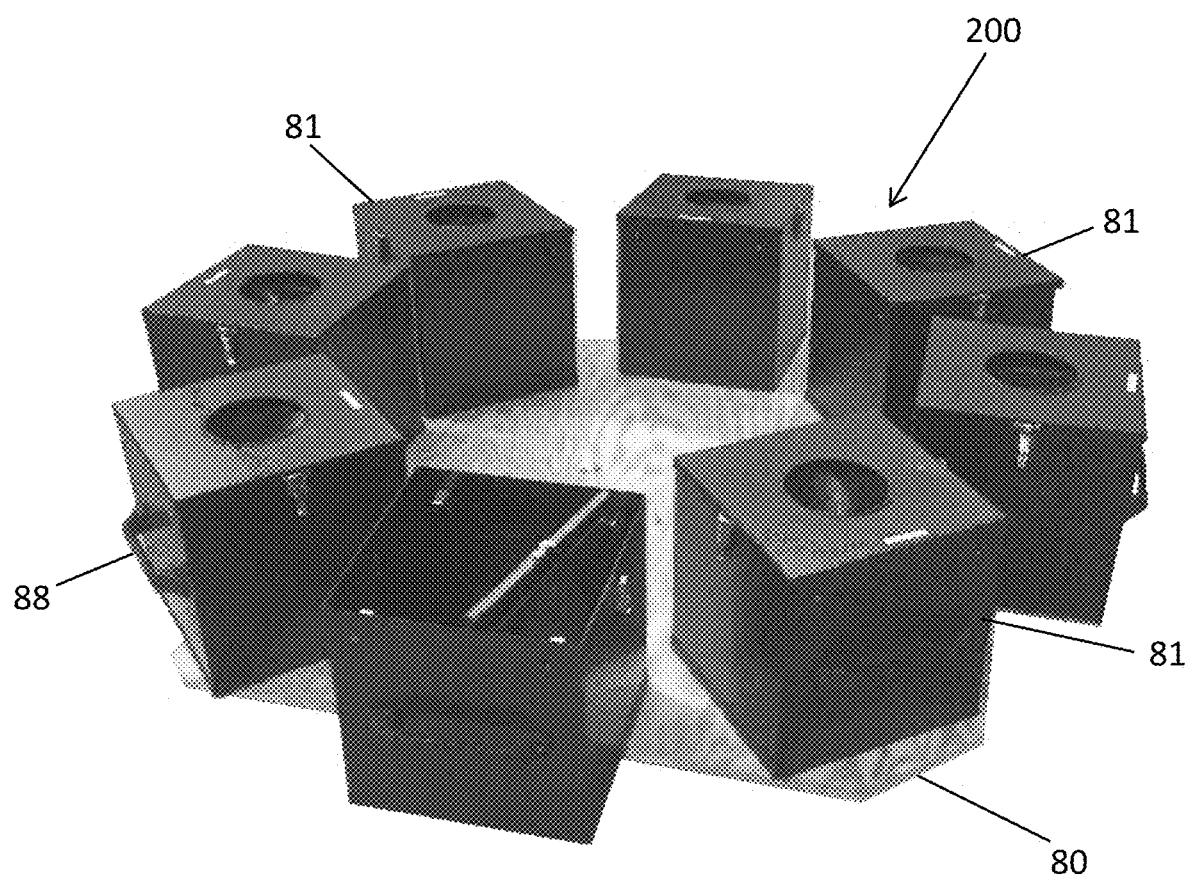
FIG. 19 is a perspective view of an alternative embodiment of certain embodiments presented herein illustrating the rotatable carousel shaped as a turntable with target material boxes affixed to the upper surface of the turntable.

FIGS. 1-18 generally illustrate different aspects of a scent training wheel 100. It is to be appreciated that scent training wheels in accordance with embodiments presented herein may have a number of different configuration/arrangements, and that the specific arrangements of FIGS. 1-18 are generally illustrative of the embodiments presented herein. For example, FIGS. 19-21 illustrate a scent training wheel 200 for training animals to detect and respond to target scents in accordance with alternative embodiments presented herein.

Figure 21:
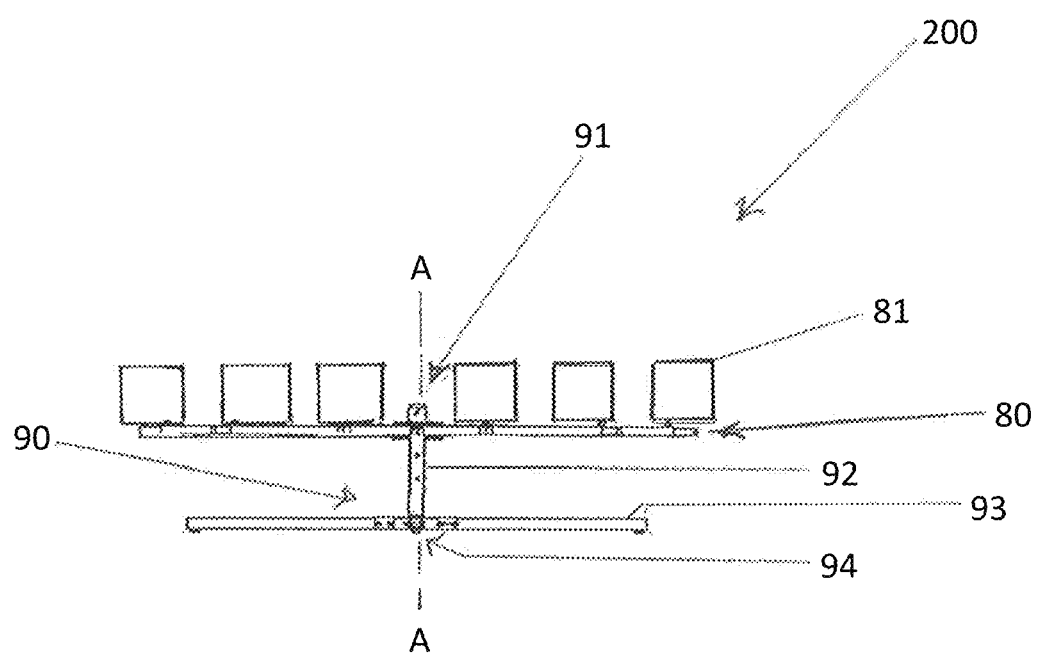
FIG. 21 illustrates a side view of an alternative scent training wheel with the rotatable carousel illustrated in FIG. 19 mounted to an exemplary support base accordance with certain embodiments presented herein.

More specifically, FIG. 21 illustrates that the scent training wheel 200 comprises a support base 90, and a rotatable carousel 80 shaped as a turntable, mechanically coupled to support base 90 via a spinner hub assembly 91. In addition, a plurality of receptacles (e.g., boxes) 81 are disposed on (e.g., affixed to) an upper surface of rotatable carousel 80. The spinner hub assembly 91 may be fabricated in a manner substantially similar to the spinner hub assembly 31 described above. In this regard, spinner hub assembly 91 may include a locking mechanism and a height adjustment mechanism substantially similar to the locking mechanism and height adjustment mechanism of spinner hub assembly 31. As further illustrated in FIG. 21, support base 90 may be constructed in a manner substantially similar to support base 10 of scent training wheel 100, i.e., the support base may have an upstanding tubular post 92 attached to a plurality of support legs 93 by a base plate 94 as described above with respect to support base 10. However, support base 90 may differ from support base 10 in one aspect; the length of cylindrical tubular post 92 may be shorter to permit carousel 80 to rotate closer to the floor, ground, or any other support surface. Moreover, rotatable carousel 80 may include a circular through-hole (not shown) formed in the center of the turntable to accommodate tubular post 92 and spinner hub assembly 31.

Figure 20:
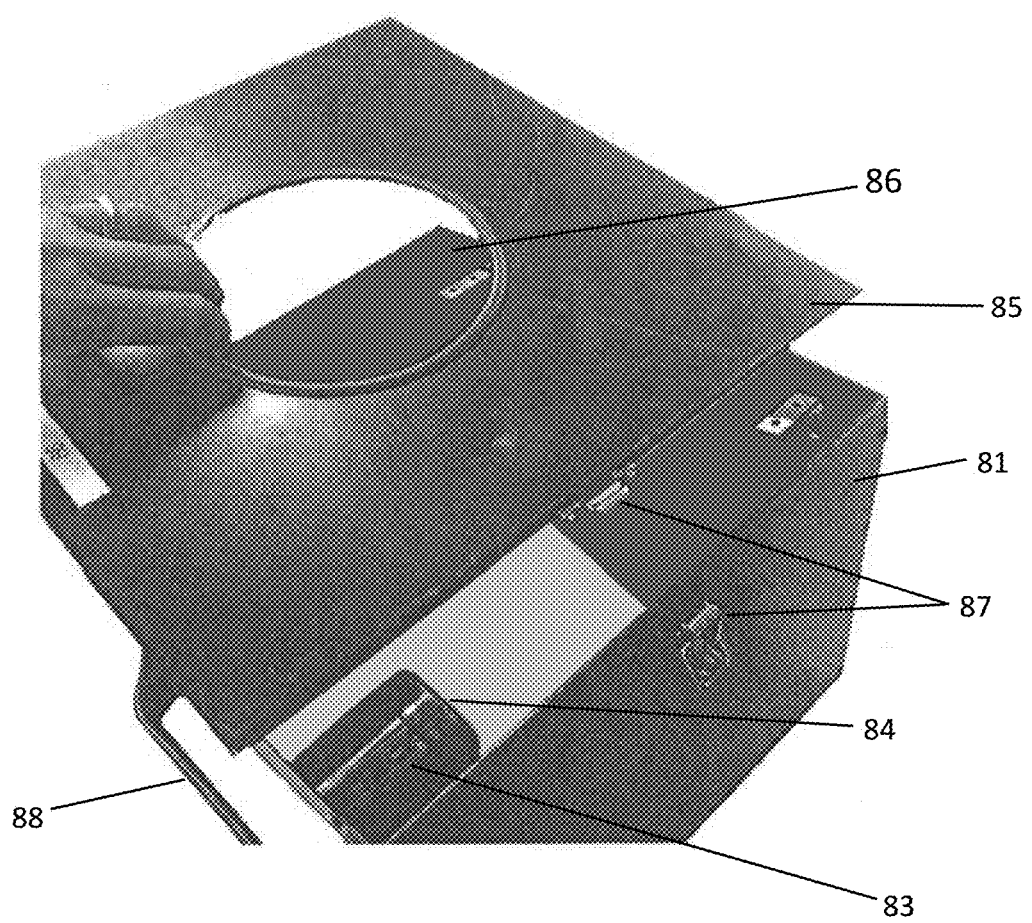
FIG. 20 is an exploded perspective view from above, right, of an exemplary target material box illustrated in FIG. 19 with the box cover partially removed to show an exemplary target material receptacle within the interior of the box.

In certain embodiments, each box 81 may have a handle 88 attached to an exterior wall surface of the box and an interior cavity configured to hold a container 83 in which scent emitting target or non-target material may be placed (FIG. 20). Each container 83 may include a removable cap 84 with an array of through-holes (not shown) to permit scents from target/non-target material placed within the receptacles to waft out into the air for detection by a dog being trained.

As further shown in FIG. 20, each box 81 includes a removable cover 85 having a large hole 86 enabling an animal (e.g., dog) to introduce its nose completely into the box to detect scents emitted by target and non-target materials. A latching mechanism 87 is provided to securely attach cover 85 in assembled relationship to the body of the box so the cover will remain firmly in place during repeated rotation (spinning) of the turntable. The latching mechanism may be, for example, a drawhook toggle latch, although other types of latching mechanisms may be used in various embodiments. As illustrated in FIG. 20, the toggle latch keeper element is affixed to the cover, while the toggle latch lever assembly is attached to the exterior wall surface of the box body.

Moreover, while exemplary boxes 81 are shown in FIGS. 19-20 as having a square configuration, it should be appreciated that other suitable configurations may also be utilized. Furthermore, the boxes may be fabricated from any conventional well know material such as plastic or metal, for example, but not limited to, aluminum or aluminum alloy.

In summary, the scent training wheel as described above may be particularly useful for performing target scent "imprinting" in animals. In certain examples, scent training wheel 100, as well as scent training wheel 200 illustrated in the alternative embodiment in FIGS. 19-20, may be useful for not only imprinting an animal on novel scents but may be useful for ongoing training of an animal to strengthen and maintain a target scent/reward association. The target scent source material may comprise any material that provides or replicates a scent that the user would like an animal to eventually learn to detect. In general, the target scent source material is configured to release/emit airborne scent molecules into the vicinity of the receptacle (cup) 33 or receptacle (box) 81. The material may be any material that gives off a scent/odor that an animal can perceive. The scent (odor) given off by the material may include, for example, narcotic scents, explosives scents, chemical and biological agent scents, as well as currency scents, foodstuff scents, insect scents, cancer cell scents, etc.

As noted, the specific training examples provided above are merely illustrative. The scent training wheel in accordance with embodiments presented herein may be modified to train other animals for target scent identification. Additionally, scent training wheels in accordance with embodiments presented herein may have different shapes and sizes. As such, the invention described and claimed herein is not to be limited in scope by the specific embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. Also, it is understood that various omissions or substitutions of equivalents are contemplated as circumstances may suggest or render expedient, but is intended to cover the application or implementation without departing from the spirit or scope of the claims of the present invention. Although specific terms are employed herein, they are used in a generic and descriptive sense only and not for purposes of limitation.

What is claimed is:

1. A scent training wheel for training animals to detect and respond to target scents, comprising:
   a base configured to be positioned on a support surface;
   a rotatable carousel comprising a central receiving aperture and a series of through-holes positioned adjacent to and extending around the central receiving aperture;
   a plurality of receptacles coupled to the rotatable carousel, wherein the receptacles are configured to retain scent source material therein; and
   a spinner hub assembly mechanically coupling the rotatable carousel to the base, wherein the spinner hub assembly is configured to permit the carousel to rotate relative to the base and to selectively lock the rotatable carousel in a selected position relative to the base,
   wherein the spinner hub assembly comprises a washer plate disposed between a top plate and a bottom plate, each plate having a substantially similar annular configuration and including:
      a circular central hub receiving aperture, and
      at least one through-aperture located at a point adjacent an outer periphery thereof, and
   wherein the through-apertures of the washer plate, the top plate, and the bottom plate are aligned with one another and are alignable with at least one of the through-holes in the rotatable carousel to receive a locking pin to selectively lock the rotatable carousel in the selected position relative to the base.

2. The scent training wheel of claim 1, wherein the at least one through-aperture in each of the washer plate, the top plate, and the bottom plate comprises a plurality of through-apertures.

3. The scent training wheel of claim 1,
   wherein the spinner hub assembly further comprises a center plate disposed between the washer plate and the top plate, the center plate having an annular configuration substantially smaller than the annular configuration of each said top plate and washer plate to provide a circular gap between the top plate and the washer plate which extends from an outer periphery of the center plate to an outer periphery of the top and washer plates,
   wherein the gap is configured to receive a rotary plate for rotation about the center plate when the spinner hub assembly is in an assembled configuration.

4. The scent training wheel of claim 3, wherein said center plate includes:
   a circular central hub receiving aperture having a diameter substantially the same as the diameter of the central hub receiving aperture of the top, bottom and washer plates, and
   an array of equally spaced apart through-holes positioned on a reference circle extending about the central hub receiving aperture.

5. The scent training wheel of claim 3,
   wherein the annular center plate has an outside diameter,
   wherein the diameter of central receiving aperture of the rotary plate is slightly larger than the outside diameter of the center plate, and
   wherein the center plate, when the spinner hub assembly is in an assembled configuration, fits into the central receiving aperture of the rotary plate and provides a shoulder about which the rotary plate rotates to permit rotation of the carousel relative to the base.

6. The scent training wheel of claim 1, wherein the receptacles comprise cups, and wherein the scent training wheel further comprises a plurality of radially extending support arms each coupling a cup to the rotatable carousel.

7. The scent training wheel of claim 6,
wherein each radially extending support arm is formed as an elongated hollow tube and includes an elongated extension support arm configured to be telescopically received within an interior of the hollow support arm.

8. The scent training wheel of claim 1, wherein the receptacles comprise boxes configured to be disposed on an upper surface of the rotatable carousel.

9. The scent training wheel of claim 8,
wherein each box has an interior cavity configured to hold a receptacle in which scent emitting material is placed,
wherein each receptacle includes a removable cap with an array of through-holes permitting scents from the scent emitting material to waft out into the interior cavity of the box, and
wherein each box further has a removable cover including an opening configured to permit an animal being trained to introduce its nose completely into the interior cavity to detect scents emitted by the scent emitting material.

10. The scent training wheel of claim 1, wherein the base comprises:
a plurality of elongated legs extending substantially parallel to the rotatable carousel; and
an elongated post extending from the legs to the spinner hub assembly.

11. A scent training wheel, comprising:
a base configured to be positioned on a support surface;
a spinner hub assembly connected to the base;
a rotatable carousel comprises a central aperture coupled to the spinner hub assembly for rotation about a vertical axis and a series of through-holes positioned adjacent to and extending around the central aperture; and
a plurality of receptacles attached to the rotatable carousel, said receptacles having an interior cavity configured to retain scent emitting source material;
wherein the spinner hub assembly includes a hollow tubular hub pipe and a plurality of annular plates secured about the tubular hub pipe, wherein each annular plate has an outer periphery and at least one through-aperture located at a point adjacent the outer periphery thereof, wherein the through-apertures in the plurality of annular plates are alignable with one another and with one of the a series of through-holes in the rotatable carousel to receive a locking device to selectively lock the rotatable carousel in a selected position relative to the base.

12. The scent training wheel of claim 11, wherein the annular plates comprise a washer plate disposed between a top plate and a bottom plate, wherein each plate has a substantially similar annular configuration and including:
a circular central hub receiving aperture, and
at least one through-aperture located at a point adjacent an outer periphery thereof, wherein the through-apertures of the washer plate, the top plate, and the bottom plate are aligned with one another and are alignable with at least one of the through-holes in the rotatable carousel to receive a locking pin to selectively lock the rotatable carousel in the selected position relative to the base.

13. The scent training wheel of claim 12,
wherein the spinner hub assembly further comprises a center plate disposed between the washer plate and the top plate, the center plate having an annular configuration substantially smaller than the annular configuration of each said top plate and washer plate to provide a circular gap between the top plate and the washer plate which extends from an outer periphery of the center plate to an outer periphery of the top and washer plates,
wherein the gap is configured to receive a rotary plate for rotation about the center plate when the spinner hub assembly is in an assembled configuration.

14. The scent training wheel of claim 11, wherein the receptacles comprise cups, and wherein the scent training wheel further comprises a plurality of radially extending support arms each coupling a cup to the rotatable carousel.

15. The scent training wheel of claim 11, wherein the receptacles comprise boxes configured to be disposed on an upper surface of the rotatable carousel.

16. The scent training wheel of claim 11, wherein the base comprises:
a plurality of elongated legs extending substantially parallel to the rotatable carousel; and
an elongated post extending from the legs to the spinner hub assembly.

17. The scent training wheel of claim 7, wherein a ring-shaped sleeve member is attached to a distal end of each extension support arm, each sleeve member having a cylindrical wall defining an open ended cavity configured to removably couple a cup to the rotatable carousel.

18. The scent training wheel of claim 1, wherein the washer plate is fabricated from a thermoplastic polymer resin.

19. The scent training wheel of claim 12, wherein the washer plate is fabricated from a thermoplastic polymer resin.

20. The scent training wheel of claim 17, wherein the cylindrical wall of each sleeve member includes a through-aperture configured to receive a threaded fastener for insertion into the cavity for engaging an outer surface of the cup to provide a positive locking connection such that the cup is securely retained within the cavity during rotation of the rotatable carousel.

* * * * *